United States Patent
McLaughlin et al.

(10) Patent No.: US 11,609,809 B1
(45) Date of Patent: Mar. 21, 2023

(54) METHOD AND APPARATUS FOR THE ENHANCED DIAGNOSTIC COVERAGE OF A SECONDARY DEVICE OF A REDUNDANT CONTROLLER PAIR

(71) Applicant: Honeywell International Inc., Charlotte, NC (US)

(72) Inventors: Paul F. McLaughlin, Ambler, PA (US); Joseph Felix, Phoenixville, PA (US); James M. Schreder, Perkasie, PA (US); Robert Altimari, South Hampton, PA (US); John Rosa-Bian, Ambler, PA (US)

(73) Assignee: Honeywell International Inc., Charlotte, NC (US)

( * ) Notice: Subject to any disclaimer, the term of this patent is extended or adjusted under 35 U.S.C. 154(b) by 52 days.

(21) Appl. No.: 17/411,152

(22) Filed: Aug. 25, 2021

(51) Int. Cl.
  *G06F 11/00* (2006.01)
  *G06F 11/07* (2006.01)
  *G06F 11/32* (2006.01)

(52) U.S. Cl.
  CPC ...... *G06F 11/0745* (2013.01); *G06F 11/0772* (2013.01); *G06F 11/0781* (2013.01); *G06F 11/0784* (2013.01); *G06F 11/327* (2013.01); *G06F 2201/86* (2013.01)

(58) Field of Classification Search
  CPC ............ G06F 11/0772; G06F 11/0781; G06F 11/0784; G06F 11/327; G06F 11/0745; G06F 11/221; G06F 11/2221; G05B 23/0262; G05B 23/0272; G05B 23/0267
  See application file for complete search history.

(56) References Cited

U.S. PATENT DOCUMENTS

| | | | | |
|---|---|---|---|---|
| 5,834,856 A | * | 11/1998 | Tavallaei | G06F 11/26 307/64 |
| 6,170,044 B1 | * | 1/2001 | McLaughlin | G05B 9/03 711/112 |
| 7,844,852 B2 | * | 11/2010 | Koishi | G06F 11/2097 714/13 |

(Continued)

OTHER PUBLICATIONS

Gotter, Florian et al., Retaining the operational status of a space mission during the loss of the main control system using virtualization, May 5-9, 2014, American Institute of Aeronautics and Astronautics (Year: 2014).*

*Primary Examiner* — Marc Duncan
(74) *Attorney, Agent, or Firm* — Paschall & Associates, LLC; James C. Paschall; Anthony Miologos

(57) ABSTRACT

A method for use by a primary device associated with a secondary device of a redundant pair, the primary device issuing a synchronization request to its control database causing the primary device to send a tracked memory file storage of the primary device to the secondary device to update the secondary device control database and to periodically send on request of the primary device the cached changes made in the primary device to the secondary device to update the secondary device control database. The secondary device using the updated control database to identify communications connections and paths to I/O modules and peer devices assigned to the secondary device and to perform diagnostic testing of the communications connections and paths identified by the interrogation and send diagnostic messages upon detection of faults in the communication connections and paths identified.

20 Claims, 4 Drawing Sheets

(56) References Cited

U.S. PATENT DOCUMENTS

| | | | |
|---|---|---|---|
| 8,996,139 B2* | 3/2015 | Jordan | G05B 19/0428 700/20 |
| 9,990,286 B1 | 6/2018 | McLaughlin et al. | |
| 10,503,617 B2* | 12/2019 | Massey, Jr. | G06F 11/2097 |
| 11,003,631 B2 | 5/2021 | Drayton | |
| 11,009,840 B2 | 5/2021 | McLaughlin et al. | |
| 11,036,656 B2 | 6/2021 | McLaughlin et al. | |
| 2018/0120796 A1* | 5/2018 | Tegnell | G05B 15/02 |

* cited by examiner

METHOD AND APPARATUS FOR THE ENHANCED DIAGNOSTIC COVERAGE OF A SECONDARY DEVICE OF A REDUNDANT CONTROLLER PAIR

TECHNICAL FIELD

This disclosure relates generally to industrial process control and automation systems. More specifically, this disclosure relates to a method and apparatus for the enhanced diagnostic coverage of a secondary device of a redundant controller pair using the database knowledge of the primary device.

BACKGROUND

Industrial process control and automation systems are often used to automate large and complex industrial processes. These types of systems routinely include various components such as sensors, actuators, and process controllers. Some of the process controllers can receive measurements from the sensors and generate control signals for the actuators. The failure of an industrial control and automation system (such as the failure of a process controller) can lead to costly downtimes. For example, there is often expense involved in restarting an industrial process, along with actual production losses resulting from a failure. Thus, control and automation systems often include redundant control system components, such as redundant process controllers, that operate in partnership in a primary/secondary scheme. Redundant process controllers typically need to support the various components and hardware of the system in order to ensure that if one partner device can take over control of operations if the other partner device fails or otherwise goes offline.

The primary device of a traditional 1:1 redundant controller pair provides diagnostic assessment of its own hardware elements, such as for example, RAM, ROM, network transceivers etc. The primary device through its own behavior, activity, and stored database knowledge, is also able to assesses its full operational functionality, such as, its ability to communicate with all I/O signals connected to the industrial process control and automation system, peer-to-peer communication connections with other controllers, assessment of CPU and memory availability, etc. The secondary device, like the primary device provides for a diagnostic assessment of its own hardware elements, however the secondary device does not fully assess its operational functionality with regard to I/O signaling and peer-to-peer connectivity since it requires access to the primary device's database knowledge.

This disclosure therefore teaches a system and method that provides for enhanced diagnostic coverage of a secondary device's operational functionality by using the system knowledge from primary device's database knowledge. This enables for deeper and more accurate redundancy decisions allowing the secondary device to be capable of performing the full functions of a primary device once it advances to that state, either through a commanded switchover, or a failover due to a primary device failure. Additionally, the enhanced diagnostic assessment can provide annunciation of potential faults in the functional operation of the secondary device to plant personnel before the secondary device is required to perform the role of a primary.

SUMMARY

This disclosure provides a method and apparatus for implementing enhanced diagnostic coverage of a secondary device of a redundant controller pair using the database knowledge of the primary device.

In a first embodiment, a method is disclosed for the enhanced diagnostic coverage of a secondary device associated with a redundant primary device connected by communication connections and communication paths of a communication network to a plurality of I/O modules, the method includes synchronizing the control database of the primary device to the secondary device by sending a request by the primary device to transfer a tracked memory file storage of the primary device to the secondary device, the synchronization request causing a full copy of the tracked memory file storage data to be transferred to the secondary device to update the secondary device control database. Tracking changes made to the tracked memory storage of the primary device by a tracking device driver are written to a buffer for transfer of the tracked data changes to the secondary device to update the secondary device control database with any changes made to the primary device control database. The method further includes interrogating by the secondary device its control database to identify communications connections and paths to the I/O modules assigned to the secondary device and using communication diagnostics, the secondary device performs diagnostic testing of the communications connections and paths identified by the interrogation. The method additionally includes sending by the secondary device diagnostic messages on the communication network upon detection of a fault in the communication connections and paths identified by the diagnostic testing.

In a second embodiment, an apparatus is disclosed for the enhanced diagnostic coverage of a secondary device associated with a redundant primary device connected by communication connections and communication paths of a communication network to a plurality of I/O modules. The primary and the secondary device each including at least one processor and at least one memory and the at least one processor of the primary device issuing a synchronization request to a control database of the at least one memory of the primary device to transfer a tracked memory file storage of the primary device to the secondary device. The synchronization request causing a full copy of the tracked memory file storage of the primary device to be transferred to the secondary device to update the secondary device control database. A tracking device driver tracks changes made to the tracked memory storage of the primary device and writes any data changes to a buffer for transfer of the tracked data changes to the secondary device to update the secondary device control database with any changes made to the primary device control database. Interrogation software executed by the at least one processor of the secondary device interrogates the control database of the secondary device to identify communication connections and communication paths to the I/O modules assigned to the secondary device. Communication path diagnostic software is executed by the at least one processor of the secondary device that performs diagnostic testing of the communication connections and paths identified in the interrogation of the control database of the secondary device. The secondary device sending diagnostic messages on the communication network upon detection of a fault in the communication connections and paths identified by the diagnostic testing.

In a third embodiment, a non-transitory computer readable medium is disclosed containing instruction that when executed cause at least one processing device of a primary device and at least one processor of an associated secondary device connected by communication connections and communication paths of a communication network to a plurality of I/O modules, to synchronize the control database of the primary device to the secondary device by sending a request by the primary device to transfer a tracked memory file storage of the primary device to the secondary device. The synchronization request causing a full copy of the tracked memory file storage data to be transferred to the secondary device to update the secondary device control database. The primary device tracks changes made to the tracked memory storage of the primary device by a tracking device driver and writing the data changes to a buffer for transfer of the tracked data changes to the secondary device to update the secondary device control database with any changes made to the primary device control database. The secondary device interrogates its control database to identify communications connections and paths to the I/O modules assigned to the secondary device and using communication diagnostics the secondary device perform diagnostic testing of the communications connections and paths identified by the interrogation of the secondary device control database. The secondary device sends diagnostic messages on the communication network upon detection of a fault in the communication connections and paths identified by the diagnostic testing.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems often include redundant control system components, such as redundant process controllers. Redundant process controllers typically need to support both hardware and software redundancy in order to ensure that one device of the process controller pair can take over control operations if the other device fails or otherwise goes offline. Process control industry customers have an expectation of high reliability when using fault-tolerant control system components that include hardware and software redundancy. To support high reliability, process data received or generated by the primary device of a process controller pair also typically needs to be provided to the secondary device of the process controller pair. This enables the secondary device to continue to provide control of the process in case the primary device fails or otherwise goes offline.

This disclosure provides techniques for supporting enhanced diagnostic coverage by a secondary device by using the system knowledge from the primary device's control database. The extended diagnostic coverage enables a deeper and more accurate redundancy decisions as well as the report of faults to plant personnel before the secondary device is required to perform the role of the primary device. The enhanced secondary device's diagnostic coverage independently ensures that the secondary device is capable of performing the full functions of the primary device once it advances to that state, either through a commanded switchover or a failover due to the failure of the primary device.

Figure 1:
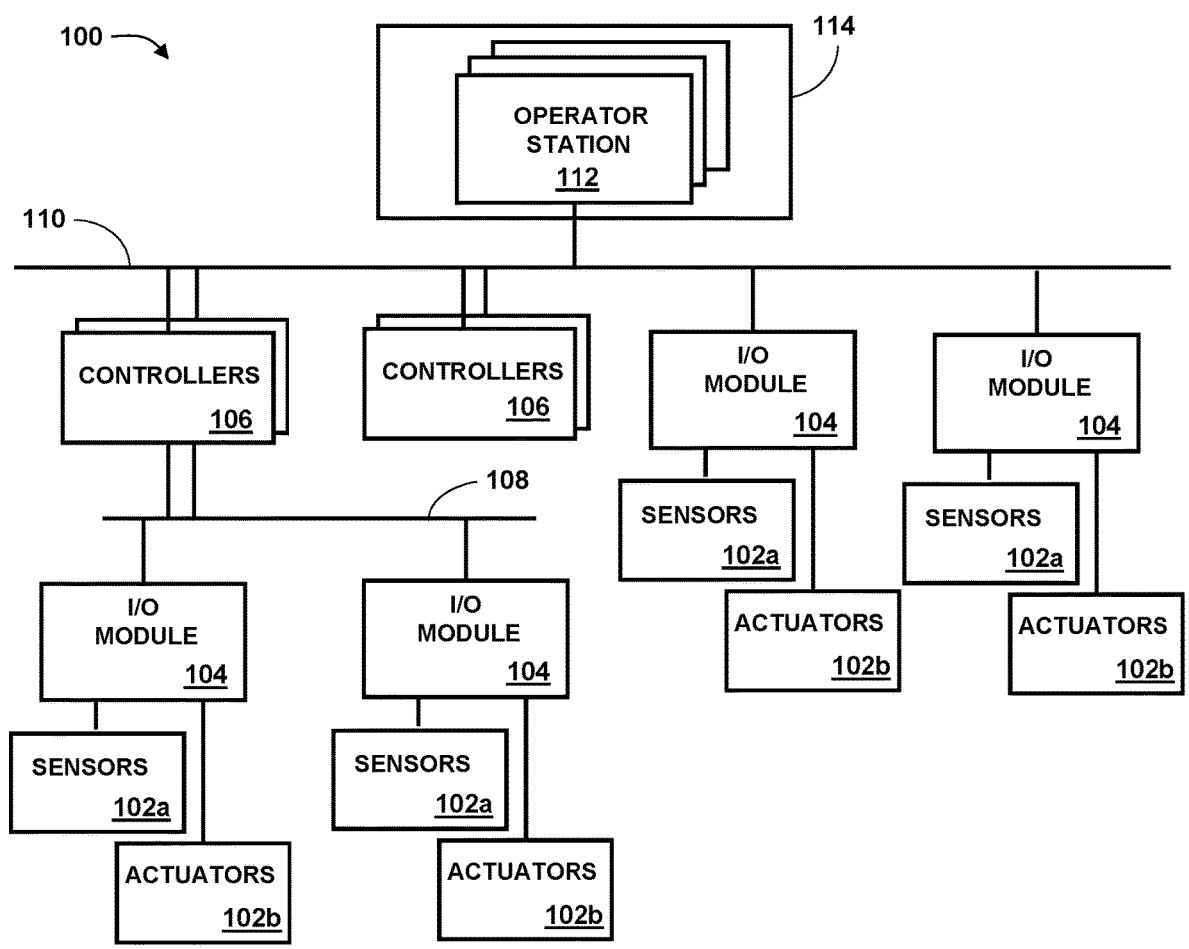
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure or field device for measuring one or more characteristics in a process system. Each of the actuators 102b includes any suitable structure or field device for operating on or affecting one or more conditions in a process system.

At least one input/output (I/O) module 104 is coupled to the sensors 102a and actuators 102b. The I/O modules 104 facilitate interactions with the sensors 102a, actuators 102b, or other field devices (not shown). For example, an I/O module 104 could be used to receive one or more analog inputs (AIs), digital inputs (DIs), digital input sequences of events (DISOEs), pulse accumulator inputs (PIs), or other inputs from one or more field devices. An I/O module 104 could also be used to provide one or more analog outputs (AOs), digital outputs (DOs), or other outputs to one or more field devices. Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O modules 104. A second set of controllers 106 could be used to optimize the control logic or other operations performed by the first set of controllers.

At least one pair of controllers 106 in the system 100 can function as a redundant pair of process controllers. For these controllers 106, it is common for one controller 106 to be operating in the primary role as a primary device, where that controller 106 is receiving process data (such as from one or more sensors 102a), performing calculations, and generating output (such as one or more control signals for one or more actuators 102b). Another controller 106 typically operates in the secondary or backup mode as a secondary device, where the secondary device 106 receives the data that is received or generated by the primary device 106 and is ready to take over control if the primary controller 106 fails or otherwise goes offline. Note that one, some, or all of the controllers 106 in the system 100 could have an associated redundant controller.

Each controller 106 includes any suitable structure for controlling one or more aspects of an industrial process. At least some of the controllers 106 could, for example, represent proportional-integral-derivative (PID) controllers or multivariable controllers, such as the Profit Controller or other types of controllers implementing model predictive control (MPC) or other advanced predictive control. As a particular example, each controller 106 could represent a computing device running a real-time operating system, a WINDOWS operating system, or other operating system.

At least some of the controllers 106 can interact with the field devices through the I/O modules 104 by communicating over at least one I/O network 108. The I/O network 108 generally represents any suitable network configured to transport data between field devices and controllers or other control system components. For example, the I/O network 108 could represent at least one Ethernet network (such as one supporting a FOUNDATION FIELDBUS protocol), electrical signal network (such as a HIGHWAY ADDRESSABLE REMOTE TRANSDUCER or "HART" protocol), pneumatic control signal network, or any other or additional type(s) of network(s).

At least some of the controllers 106 can also interact with I/O modules 104 by communicating over at least one control network 110. The control network 110 generally represents any suitable network configured to transport data between controllers 106, I/O modules 104 and operator stations 112. Additionally, the control network 100 can also transport data between, supervisory controllers, historians, wireless nodes, or other components connected to system 100 (not shown in FIG. 1). For example, the control network 110 could represent an Ethernet network, a redundant pair of Ethernet networks (such as a FAULT TOLERANT ETHERNET network from HONEYWELL INTERNATIONAL INC.), or any other or additional type(s) of network(s).

Operator access to and interaction with the controllers 106 and other components of the system 100 can occur via various operator stations 112. Each operator station 112 could be used to provide information to an operator and receive information from an operator. For example, each operator station 112 could provide information identifying a current state of an industrial process to an operator, such as values of various process variables and warnings, alarms, or other states associated with the industrial process. Each operator station 112 could also receive information affecting how the industrial process is controlled, such as by receiving setpoints for process variables controlled by the controllers 106 or other information that alters or affects how the controllers 106 control the industrial process. Each operator station 112 includes any suitable structure for displaying information to and interacting with an operator.

Multiple operator stations 112 can be grouped together and used in one or more control rooms 114. Each control room 114 could include any number of operator stations 112 in any suitable arrangement. In some embodiments, multiple control rooms 114 can be used to control an industrial plant, such as when each control room 114 contains operator stations 112 used to manage a discrete part of the industrial plant.

Although FIG. 1 illustrates one example of an industrial process control and automation system 100, various changes may be made to FIG. 1. For example, the system 100 could include any number of sensors, actuators, I/O modules, controllers, networks, operator consoles, control rooms, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs.

In systems such as the system 100, redundant controllers 106 need an effective way to have the secondary device of a controller pair assess its full operational capability. The primary device, through its own behavior and activity, assesses its full operational functionality, such as, for example, its ability to communicate with all I/O signals, peer-peer connections with other controllers, network connections and CPU and memory availability, etc. During the course of the primary device's operation, the control database of the primary device indirectly updates its control database. The secondary partner device however is not able to fully assess its operational capabilities and functions using only the secondary control database since it does not have the knowledge acquired by the primary device during its operation. As described in more detail below, a system and method is described for transferring control database knowledge from the primary device to the secondary device allowing the secondary device to use the same data and system knowledge of the primary device to assess its operational capability and to report any inconsistencies as a fault to plant personnel before the secondary device is required to perform the role of a primary device.

FIG. 1 illustrates one example of an operational industrial process control and automation system environment that can be used to implement an arrangement allowing the secondary device of a controller pair to assess its full operational capability within its operational environment. The disclosed arrangement can be used in any other suitable system, and that system may or may not relate to industrial process control and automation.

Figure 2:
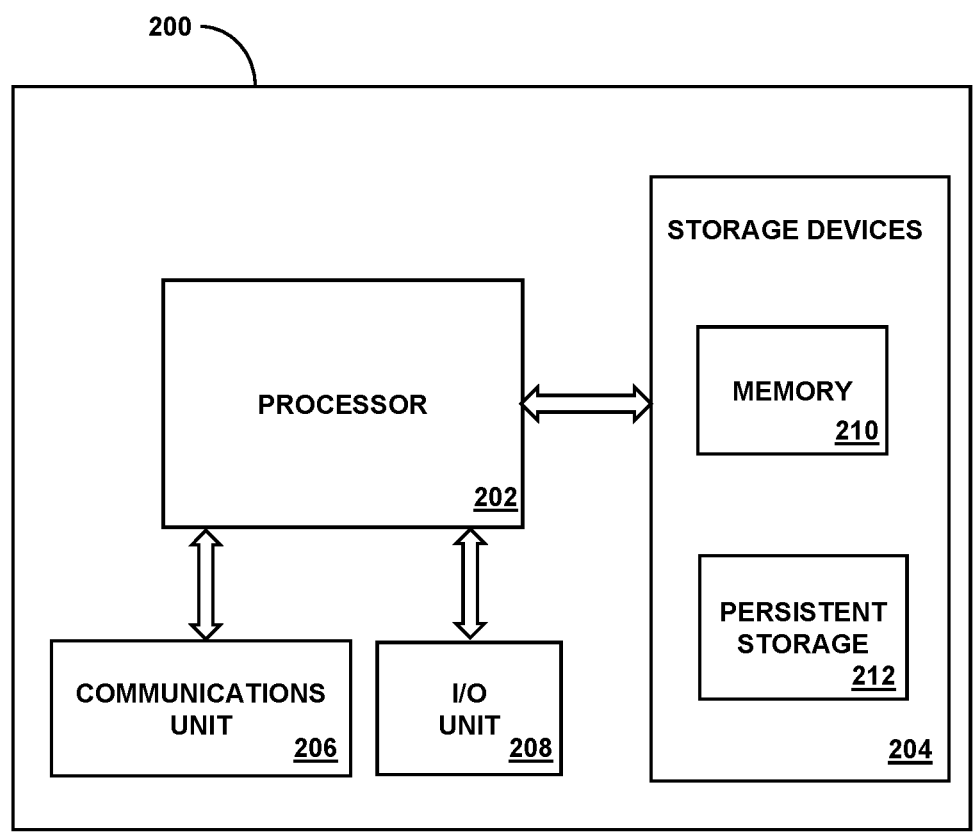
FIG. 2 illustrates an example controller device of an industrial process control and automation system according to this disclosure.

FIG. 2 illustrates an example device 200 representing a controller 106. The device 200 could, for example, represent any of the controllers 106 or other control system components used in a redundant configuration in FIG. 1. However, the device 200 could represent any other suitable device supporting operation in a redundant manner, regardless of whether the device 200 is used for process control and automation.

As shown in FIG. 2, the device 200 includes at least one processor 202, at least one storage device 204, at least one communications unit 206, and at least one I/O unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. As a particular example, the communications unit 206 could support communications with one or more sensors 102a or one or more actuators 102b over an I/O network 108. As another particular example, the communications unit 206 could support communications with higher-level components over a control network 110. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the device 200 is accessible locally or remotely over a network connection.

As described in more detail below, the processor 202 of the device 200 can be used to execute a diagnostic system that test the operational functionality of the device 200. The processor 202 of the device 200 can also be used to execute an algorithm that supports the transfer of data from the device 200 to a redundant device (such as to an associated redundant process controller 106).

Although FIG. 2 illustrates one example of a device 200 for implementing the disclosure, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of device.

Figure 3:
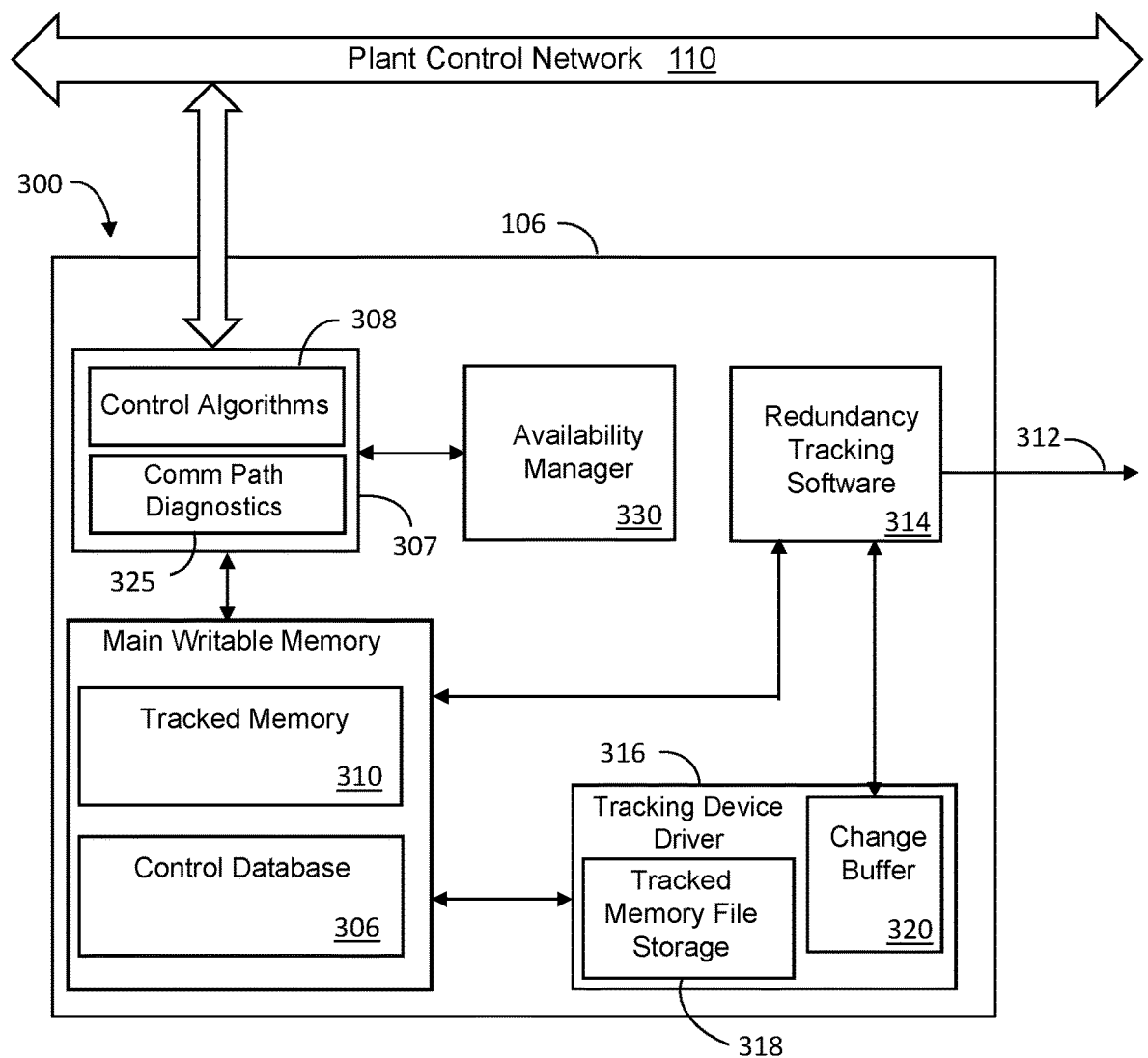
FIG. 3 illustrates an example architecture for implementing an enhanced diagnostic coverage of a secondary device of a redundant controller pair using the database knowledge of the primary device according to this disclosure.

FIG. 3 illustrates an example architecture 300 for implementing the system for transferring control knowledge from the primary devices control database to the secondary device control database according to this disclosure. For ease of explanation, the architecture 300 may be described as being implemented within the primary device and the secondary device of a controller, such as controller 106 in the system 100 of FIG. 1. The controller 106 is implemented using the device 200 of FIG. 2. However, the architecture 300 shown in FIG. 3 can be used with any suitable device and in any suitable system.

In this example, the architecture 300 includes a processor 307 that executes one or more control algorithms 308, stored in a control database 306 representing memory locations in main writable memory of a persistent storage 212, or other storage device 204. Each control algorithm 308 can be used to control one or more aspects of at least one industrial process. Each control algorithm 308 typically includes or has access to an associated tracked memory 310, which could represent memory locations in the memory 212, or other storage device 204. One operation of at least one of the control algorithms 308 is to track and send data to a redundant device, which in this example occurs via a communication path 312. The communication path 312 could represent a direct connection to the redundant device or an indirect path, such as via a network.

The redundancy tracking software 314 is used to facilitate the exchange of data with the secondary device. The same architecture 300 shown in FIG. 3 is used in both the primary and secondary device. To support the transparent identification of changes to the tracked memory 310, the architecture 300 includes a tracking device driver 316. The tracking device driver 316 contains a tracked memory file storage 318 which could represent memory locations in the memory 210, persistent storage 212, or other storage device 204. When the control algorithm 308 is executed, algorithm state data is stored into the tracked memory 310 and to control database 306. Any changes in the tracked memory 310 is updated by tracking device driver 316 to a tracked memory file storage 318. To support the transmission of data to the redundant device, the architecture 300 includes redundancy tracking software 314. Periodically or on-demand, the redundancy tracking software 314 requests the control database 306 perform a sync. that sends the control database and data in the change buffer 320 to the partner device.

Upon receipt of the sync command, the control database 306 presents the tracking device driver 316 with a list of pages in the tracked memory 310 that have been written since the last sync command. The tracking device driver 316 compares the list of the block(s) to be written to against its tracked memory file storage 318 and generates a complete set of changes between the two and writes the changes to the change buffer 320. The tracking device driver 316 can update its tracked memory file storage 318 as changes are generated and stored in the change buffer 320. The contents of the tracking buffer 320 are sent to the secondary device via communication path 312 and unpacked into the secondary device's tracked memory file storage 318. The change buffer 320 or portions thereof can be sent to the secondary device periodically, after a specified number of changes have been identified, after a specified amount of time has elapsed, or at any other suitable time(s). In this way, the secondary device is able to obtain the data changes being made by the primary device control database. With the data changes transferred from the primary device the secondary device is able to update its own memory.

In this example, the control algorithms 308 can be used to support various functions. These functions include reading data from and writing data to files on one or more physical or virtual storage devices 204. These functions also include mapping the data of the files stored on the storage device(s) 204 into any user process virtual memory address spaces. These functions further include providing the tracked memory 310 for at least one control algorithm 308 mapped into the file system 306. In addition, these functions include receiving sync requests from the redundancy tracking software 314 and committing all changes in the tracked memory 310 to the storage device(s) 204.

Although FIG. 3 illustrates one example of an architecture 300 for implementing process control redundancy, various changes may be made to FIG. 3. For example, the functionality in the architecture 300 can vary as needed or desired, such as based on the particular operating system being used in a device. Also, the algorithm(s) 308 need not relate to industrial process control and automation functions.

Once the secondary devices control database is fully synchronized with the primary devices data, as was explained above, the secondary device now has the enhanced knowledge to advance its diagnostic coverage to all the devices connected to the primary device. This could include for example the network I/O modules and controlled devices assigned to the primary and secondary devices of the redundant pair and to any peer-to-peer network connections between the redundant pair and any other controller or other controller device in the industrial process control and automation system. Upon synchronization and update of the secondary devices control database, the secondary device would interrogate its associated control database 306 to find all the connections to I/O modules and/or other nodes containing I/O modules assigned to the primary and secondary devices of the redundant pair. The processor 307 then executes a comm path diagnostics algorithm 325, to make non-control communication connections to the I/O modules 104, and to periodically test the connections. The testing is made in a manner that does not impact the primary control relationship or timing of the controller 106 to associated I/O modules 104. The testing ascertain that a reliable communication path to an I/O module 104 is available. The communication path testing could look for problems in the communication network 110, such as communication bottlenecks based on current communication bus busy messages, device timeouts, receiving (Rx) timeouts, and/or failure of alarms and/or events, among others.

Likewise, the secondary device using the comm path diagnostics 325 would also examine peer-to-peer connections, such as to other controllers in the system and likewise test the communication path to the peer nodes without impacting control performance. Other diagnostics that are enabled by this concept include 3rd party device communication paths, such as for example communication networks to $3^{rd}$ party wireless nodes, database integrity (valuable for software migration cases), and connectivity to supervisory controllers connected to of the industrial process control and automation system.

Any faults and diagnostic data detected by the comm path diagnostics 325 would be sent to and reviewed by the availability manager 330. The availability manager 330 would log the fault and its diagnostic data as a diagnostic event and prioritize the detected faults based on a critical status. Prioritizing the detected faults can include organizing the collected faults so that the most important (e.g., urgent) faults can be addressed the earliest. For example, the collected diagnostic data may include a number of abnormal parameters. The diagnostic data that contain abnormal parameters that are severely outside (e.g., exceedingly under or over) the threshold limitation value, can be listed first to establish an order. The detected faults reported to be present can also be validated so as to ensure their existence. Validating the diagnostic data of a detected fault can include comparing the collected diagnostic data to past data, the parameter settings, and functionality of the network connection to the redundant controller pair 106.

Minor events would be logged-in to an event journal and to on-line diagnostic summary and reported, by the secondary device by sending a diagnostic message along the plant network 110 to alert a user. Alerting the user can include alerting (e.g., notifying) the user via dashboard, mobile, user interface, or a report. For example, the alert messages can be provided (e.g., displayed and/or presented) to a remote operator (e.g., expert, user technician) at an associated operator station 112 connected to the plant network 110. Once alerted, a technician would repair the fault before the secondary device is required to fulfill the primary devices functions. However, embodiments of the present disclosure are not so limited. For example, diagnostic messages can be provided to any person and/or entity responsible for diagnosing, fixing, and/or resolving abnormalities associated with the automation system, and/or any person and/or entity responsible for diagnosing and/or improving field automation system operations.

In some embodiments, the diagnostic messages reported by the availability manager of the secondary device can include parameters (e.g., field parameters) and diagnostic data associated with the control system network associated with the secondary device. The set of field parameters can include information associated with the control system network, such as system configurations. For instance, the set of parameters can include polling frequency and change of value delays. The collected diagnostic data can include information relating to the set of parameters. For example, the collected diagnostic data can include sampling frequency of the points (e.g., signal processing, continuous signal, discrete signal), upload frequency, number of points and/or parameters configured, polling frequency, change of values, Among other data. For certain urgent faults, such as for example, the detection that no communication path to a I/O module 104 exists, the availability manager 330 would cause the secondary device to drop synchronization with the primary device and to send an urgent diagnostic message of the fault to an operator for the repair of the communication path. For other conditions such as when only a partial communication path failure exists the secondary device would remain in synch with the primary device and an event logged-in in the event journal.

Figure 4:
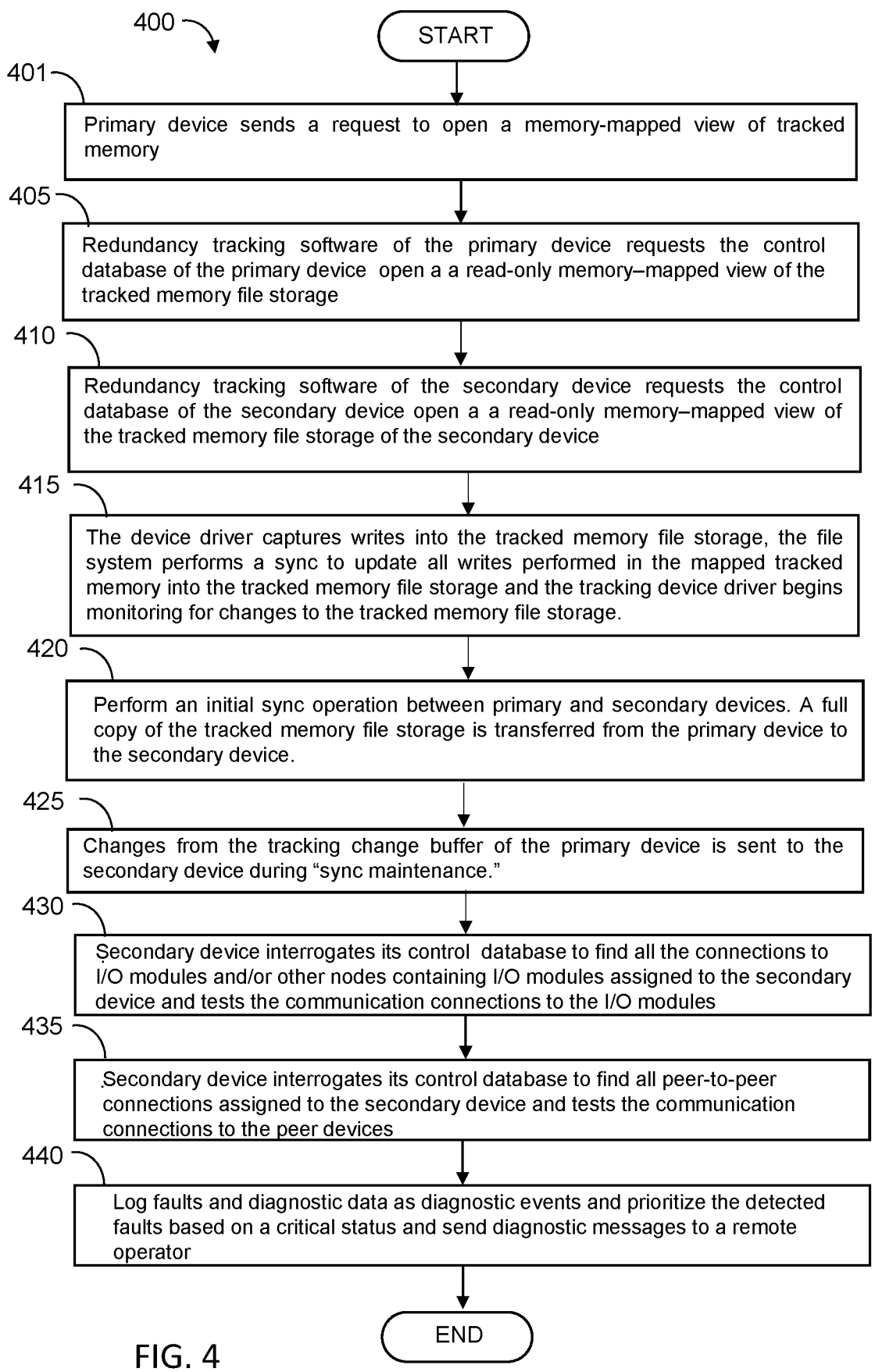
FIG. 4 illustrates an example process for implementing an enhanced diagnostic coverage of a secondary device of a redundant controller pair using the database knowledge of the primary device according to this disclosure.

FIG. 4 illustrates an example process 400 for implementing the enhanced diagnostic coverage by a secondary device by using the system knowledge from the primary device's control database in accordance with disclosed embodiments and the architecture 300 disclosed in FIG. 3.

At step 401, during initial setup, the control algorithm 308 on the primary device sends a request to the control database 306 of the primary device to open a read/write memory-mapped view of tracked memory 310 in the address space of the control algorithm 308. The control algorithm 308 will use this view to read and write state data to and from its main writable memory.

At step 405, the redundancy tracking software 314 of the primary device makes a request to the control database 306 of the primary device to open a read-only memory-mapped view of the tracked memory file storage 318 in the address space of the redundancy tracking software 314. The redundancy tracking software 314 will use this view to transfer an initial copy of the tracked memory file storage 318 to the secondary device.

Next at step 410, the redundancy tracking software 314 on the secondary device makes a request to the control database 306 of the secondary device to open a read/write memory-mapped view of the tracked memory file storage 318 in the address space of the redundancy tracking software 314 of the secondary device. The redundancy tracking software 314 of the secondary device will use this view to copy changes provided from the primary device into the secondary device in order to maintain an exact copy of the tracked memory file storage 318 of the primary device in the secondary device.

To enable the tracking device driver 316 to capture writes into the tracked memory file storage 318, control database 306 of the primary device is commanded to perform a sync, at step 415, to update all writes performed in the mapped tracked memory 310 into the tracked memory file storage 318, and the tracking device driver 316 is commanded to begin monitoring for changes to the tracked memory file storage 318. The sync command helps to align the tracked memory file storage 318 with all updates so that the tracking device driver 316 can use the tracked memory file storage 318 to detect all future updates once the tracking device driver 316 is enabled. On startup initialization, the tracking device driver 316 ensures change buffer 320 has no entries.

Prior to an initial sync operation, the primary and secondary devices are not a synchronized pair. In order to become a synchronized pair, at step 420, the two devices can perform an initial sync operation. The redundancy tracking software 314 on the primary device issues a sync request to the control database 306 of the primary device for transfer of the tracked memory file storage 318 of the primary device to the secondary device. Initial synchronization typically requires that a full copy of the tracked memory file storage 318 be transferred from the primary device to the secondary device.

At step 425, once the initial sync is complete, the two devices represent a fully synchronized pair, and all that is required is to continue to send changes from the change buffer 320 of the primary device to the secondary device during "sync maintenance." During this phase, the redundancy tracking software 314 of the primary device walks through the tracked memory file storage 318 (similar to during the initial sync above) and calculates at least one checksum for at least one block of the tracked memory file storage 318. The at least one checksum is sent to the secondary device for validation of the secondary device's copy of the tracked memory file storage 318. The redundancy tracking software 314 on the secondary device also receives the sync maintenance checksum on the current maintenance block(s) of memory, calculates a checksum for the corresponding block(s) in the tracked memory 310 of the secondary device, and compares the checksums to validate the integrity of the secondary's copy. Synchronization can be broken if the checksums do not match.

Once the secondary device control database is fully synchronized with the primary device database, as was explained above, it then has the knowledge to advance diagnostic coverage to the devices connected to the controller pair 106. In step 430 the secondary controller would interrogate its control database 306 to find all the connections to I/O modules 104 and/or other nodes containing I/O modules assigned to the controller pair. The processor 307 then executes a comm path diagnostics algorithm 325, to make non-control communication connections to the I/O modules 104, and to periodically test the connections in a manner that does not impact the primary control relationship or timing of the controller and its associated I/O modules. The testing to ascertain that a reliable communication path, such as plant control network 110 to an I/O module 104 is valid and available.

In step 435 the secondary device examines its control database 306 for peer-peer connections. The processor then executes the comm path diagnostics algorithm 325 to test the communication path, such as, for example, plant control network 110 to peer nodes without impacting control performance. Other diagnostics that are enabled by this concept include 3rd party device communication paths, such as for example communication networks to $3^{rd}$ party wireless nodes, database integrity (valuable for software migration cases), and connectivity to supervisory controllers of the of the industrial process control and automation system.

In step 440 any faults and diagnostic data detected by the comm path diagnostics 325 are sent to and reviewed by the availability manager 330. The availability manager would log the fault and its diagnostic data as a diagnostic event and prioritize the detected faults based on a critical status. Prioritizing the detected faults can include organizing the collected faults so that the most important (e.g., urgent) faults can be addressed the earliest. For example, the collected diagnostic data may include a number of abnormal parameters. The diagnostic data that contain abnormal parameters that are severely outside (e.g., exceedingly under or over) the threshold limitation value, can be listed first to establish an order. The detected faults reported to be present can also be validated so as to ensure their existence. Validating the diagnostic data of a detected fault can include comparing the collected diagnostic data to past data, the parameter settings, and functionality of the network associated with the controller pair.

The event journal and on-line diagnostic summary are reported by the secondary controller by sending a diagnostic messages along the plant network 110 to alert a user. Alerting the user can include alerting (e.g., notifying) the user via a dashboard, mobile notification, user interface, or notice presented to a remote operator (e.g., expert, user technician) at an associated operator station 112 connected to the plant network 110. Once alerted, a technician would repair the fault before the secondary controller is required to fulfill the primary controller functions.

Although FIG. 4 illustrates one example of a process for implementing a diagnostic assessment of the operational functionality of a secondary device operating in a redundant pair, various changes to the process may be made to FIG. 4. For example, while shown as series of steps, various steps shown in FIG. 4 could overlap, occur in parallel, occur in a different order, or occur multiple times. Moreover, some steps could be combined or removed, and additional steps could be added according to particular needs. In addition, while the process 400 is described with respect to the functionality of an architecture 300, the architecture described need not relate to industrial process control and automation functions.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for enhanced diagnostic coverage of a secondary device associated with a redundant primary device connected by communication connections and communication paths of a communication network to a plurality of I/O modules, the method comprising:
   synchronizing the control database of the primary device to the secondary device by sending a request by the primary device to transfer a tracked memory file storage of the primary device to the secondary device, the synchronization request causing a full copy of the tracked memory file storage data to be transferred to the secondary device to update the secondary device control database;
   tracking changes made to the tracked memory storage of the primary device by a tracking device driver and writing the data changes to a buffer for transfer of the tracked data changes to the secondary device to update the secondary device control database with any changes made to the primary device control database;
   interrogating by the secondary device its control database to identify communications connections and paths to the I/O modules assigned to the secondary device;
   using communication diagnostics, the secondary device performing diagnostic testing of the communications connections and paths identified by the interrogation; and
   sending by the secondary device diagnostic messages on the communication network upon detection of a fault in the communication connections and paths identified by the diagnostic testing.

2. The method of claim 1, further comprising:
   interrogating by the second device its control database to identify peer-to-peer communications connections and paths to other controllers assigned to the secondary device;
   using communication diagnostics, the secondary control device performing diagnostic testing of the peer-to-peer communications connections and paths identified by the interrogation; and
   sending by the secondary device diagnostic messages on the communication network upon detection of a fault in the peer-to-peer communication connections and paths identified by the diagnostic testing.

3. The method of claim 2, wherein redundancy tracking software is used by the primary device to transfer tracked memory file storage data and data changes to the secondary device.

4. The method of claim 2, wherein sending by the secondary device diagnostic messages on the communication network upon detection of a fault includes sending diagnostic messages to alert a user.

5. The method of claim 4, wherein alerting a user includes notifying the user via dashboard, mobile device, user interface, or a report displayed and/or presented at an operator station connected to the communication network.

6. The method of claim 1, wherein the primary device is connected to the secondary device through a direct communication connection.

7. The method of claim 1, wherein the tracking changes made to the tracked memory storage of the primary device by the tracking device driver and the writing of the data changes to the buffer for transfer of the tracked data changes to the secondary device in order to update of the secondary device control database with any changes made to the primary control database are performed during a synchronization maintenance to maintain the synchronization of the secondary device control database to the primary device control database.

8. The method of claim 1, wherein the method further includes:
   sending the faults detected by the comm path diagnostics to an availability manager; and
   logging and prioritizing by the availability manger the detected faults based on a critical status.

9. The method of claim 8, wherein:
   prioritizing the detected faults includes organizing the collected faults so that the most important faults can be addressed the earliest; and
   logging the detected events includes logging the detected events in an event journal and to an on-line diagnostic summary.

10. An apparatus for enhanced diagnostic coverage of a secondary device associated with a redundant primary device connected by communication connections and communication paths of a communication network to a plurality of I/O modules, the apparatus comprising:
   the primary and secondary device each including at least one processor and at least one memory; and the at least one processor of the primary device issuing a synchronization request to a control database of the at least one memory of the primary device, to transfer a tracked memory file storage of the primary device to the secondary device, the synchronization request causing a full copy of the tracked memory file storage of the primary device to be transferred to the secondary device to update the secondary device control database;

a tracking device driver tracking changes made to the tracked memory storage of the primary device and writing the data changes to a buffer for transfer of the tracked data changes to the secondary device to update the secondary device control database with any changes made to the primary device control database;

interrogation software executed by the at least one processor of the secondary device that interrogates the control database of the secondary device to identify communication connections and communication paths to the I/O modules assigned to the secondary device;

comm path diagnostic software executed by the at least one processor of the secondary device that performs diagnostic testing of the communication connections and paths identified in the interrogation of the control database of the secondary device; and the secondary device sending diagnostic messages on the communication network upon detection of a fault in the communication connections and paths identified by the diagnostic testing.

11. The apparatus of claim 10, wherein:

interrogation software executed by the at least one processor of the secondary device that interrogates the control database of the secondary device to identify peer-to-peer communications connections and paths to other controllers assigned to the secondary device;

comm path diagnostic software executed by the at least one processor of the secondary device that performs diagnostic testing of the peer-to-peer communications connections and paths identified by the interrogation; and the secondary device sending diagnostic messages on the communication network upon detection of a fault in the peer-to-peer communication connections and paths identified by the diagnostic testing.

12. The apparatus of claim 11, wherein redundancy tracking software executed by the primary device is used to transfer tracked memory file storage data and data changes to the secondary device.

13. The apparatus of claim 11, wherein sending by the secondary device diagnostic messages on the communication network upon detection of a fault includes sending diagnostic messages to alert a user.

14. The apparatus of claim 13, wherein alerting a user includes notifying the user via a dashboard, mobile device, user interface, or a report displayed and/or presented at an operator station connected to the communication network.

15. The apparatus of claim 10, wherein the primary device is connected to the secondary device through a direct communication connection.

16. The apparatus of claim 10, wherein the tracking changes made to the tracked memory storage of the primary device by the tracking device driver and the writing of the data changes to the buffer for transfer of the tracked data changes to the secondary device in order to update of the secondary device control database with any changes made to the primary control database are performed during a synchronization maintenance to maintain the synchronization of the secondary device control database to the primary device control database.

17. The apparatus of claim 10, wherein the secondary device includes: an availability manager that receives the faults detected by the comm path diagnostics, the availability manager logging and prioritizing the detected faults based on a critical status.

18. The apparatus of claim 17, wherein:

prioritizing the detected events includes organizing the collected faults so that the most important faults can be addressed the earliest; and logging the detected events includes logging the detected events in an event journal and to an on-line diagnostic summary.

19. A non-transitory computer readable medium containing instruction that when executed cause at least one processing device of a primary device and at least one processor of an associated secondary device connected by communication connections and communication paths of a communication network to a plurality of I/O modules, to:

synchronize the control database of the primary device to the secondary device by sending a request by the primary device to transfer a tracked memory file storage of the primary device to the secondary device, the synchronization request causing a full copy of the tracked memory file storage data to be transferred to the secondary device to update the secondary device control database;

track changes made to the tracked memory storage of the primary device by a tracking device driver and writing the data changes to a buffer for transfer of the tracked data changes to the secondary device to update the secondary device control database with any changes made to the primary device control database;

interrogate by the secondary device its control database to identify communications connections and paths to the I/O modules assigned to the secondary device;

using communication diagnostics by the secondary device perform diagnostic testing of the communications connections and paths identified by the interrogation of the secondary device control database; and send by the secondary device diagnostic messages on the communication network upon detection of a fault in the communication connections and paths identified by the diagnostic testing.

20. The non-transitory computer readable medium of claim 19, further containing instruction that, when executed cause the at least one processing device of the secondary device to:

interrogate by the second devices control database to identify peer-to-peer communications connections and paths to other controllers assigned to the secondary device;

use communication diagnostics to performing diagnostic testing of the peer-to-peer communications connections and paths identified by the interrogation of the secondary device control database; and send by the secondary device diagnostic messages on the communication network upon detection of a fault in the peer-to-peer communication connections and paths identified by the diagnostic testing.

\* \* \* \* \*